United States Patent [19]

Hwang

[11] Patent Number: 5,040,299

[45] Date of Patent: Aug. 20, 1991

[54] BASE FOR CUTTING A CIRCULAR PLATE WITH A GAS BURNER

[76] Inventor: Ming Y. Hwang, 10, Lane 37, Hae Yang 2nd Rd., Feng Shan City, Kaohsiung Hsien, Taiwan

[21] Appl. No.: 527,345

[22] Filed: May 23, 1990

[51] Int. Cl.⁵ ............................................. B43L 9/04
[52] U.S. Cl. .................................... 33/27.03; 266/70
[58] Field of Search ....................... 33/27.03, DIG. 1; 266/70; 335/288, 298, 295, 287, 302

[56] References Cited

U.S. PATENT DOCUMENTS 4,055,824  10/1977  Baermann ..................... 335/295 X
4,314,219  2/1982  Haraguchi .......................... 335/298

FOREIGN PATENT DOCUMENTS 145684  6/1954  Sweden ............................. 33/27.03

Primary Examiner—Harry N. Haroian
Attorney, Agent, or Firm—Fleit, Jacobson, Cohn, Price, Holman & Stern

[57] ABSTRACT

A base for cutting circular plate with a gas burner comprising a base body to keep itself immovable on the iron plate to be cut by means of magnetism, a rotatable shaft inserting in the base body and combining with and statilizing an arm having a holed base at its end to guide a gas burner kept in the central hole in the holed base so that the gas burner can cut a circular iron plate, moving around in a circle with the rotatable shaft as the center of the circle.

2 Claims, 5 Drawing Sheets

BASE FOR CUTTING A CIRCULAR PLATE WITH A GAS BURNER

BACKGROUND OF THE INVENTION

A traditional method for cutting a circular plate with a gas burner needs a tool as shown in FIG. 1, a center post A combined with an arm having its end fixed with a base B. A circle has to be marked out on a metal plate with a compass, and then its center has to be marked with a point with a center punch, and on the point the tip of said center post A is placed. A gas burner is to be put into a hole in the base B to cut the circle marked on the plate by moving the base B along said marked circle with the post A functioning as the center. In the cutting process, the post A may move or slide away from the punched point so that the cut product may not have a correctly circular shape.

SUMMARY OF THE INVENTION

In order to improve the shortcoming of a traditional tool for cutting a circular metal plate, this invention has been devised to furnish a base for cutting a circular plate with a gas burner.

The base for cutting a circular plate with a gas burner in the present invention comprises a base body, a rotatable shaft, an arm and two magnetic blocks as the main components.

The base body has a vertical central hole for the rotatable shaft to fit and rotate therein, two horizontal round parallel holes for the two oval magnetic blocks to fit in, two horizontal insulators fixed along on and under each horizontal hole, an oval opening at the front surface for an oval cap to cover the two magnetic blocks and a main gear engaging with two side gears fixed on an oval end projections of each magnetic block, and a small horizontal hole in the rear surface to communicate with the vertical central hole for sealing therein a ball and a spring urging the ball to fit in a ring groove in the rotatable shaft to limit said shaft to rotate at a definite height.

The rotatable shaft has its small-size lower section inserting in the vertical hole in the base and its large-size upper section formed with a horizontal hexagonal through hole for the arm to pass freely through so that the length of the arm can be altered from the point pressed by a thumb screw knob to its end holed base for holding a gas burner, and thus the circle to be cut on a metal plate can be adjusted.

The hexagonal arm has a metric graduations marked on and can pass through the hexagonal hole in the rotatable shaft with its free end so that its length can be adjusted to suit the circle to be cut, and a holed base at the other end for inserting a gas burner which can be moved around the circle to cut a material plate with the rotatable shaft as a center.

The two magnetic blocks contained in the base can be turned for 90° from the position that the flat surfaces are horizontal to the position that the flat surfaces are vertical and the oval surfaces are horizontal to magnetize the base, which then sucks the material plate to stabilize the base on it so that the cutting process of the gas burner can be carried on smooth and accurately. The turning of said blocks are performed by a handle at the outside of the oval cap, and the handle is combined with a main gear and when the handle is turned for 90°, the main gear and the side gears are turned for the same angle so that the two magnetic blocks are also rotated for 90° so as to magnetize the base body for sucking the material plate.

DETAILED DESCRIPTION OF THE INVENTION

Figure 1:
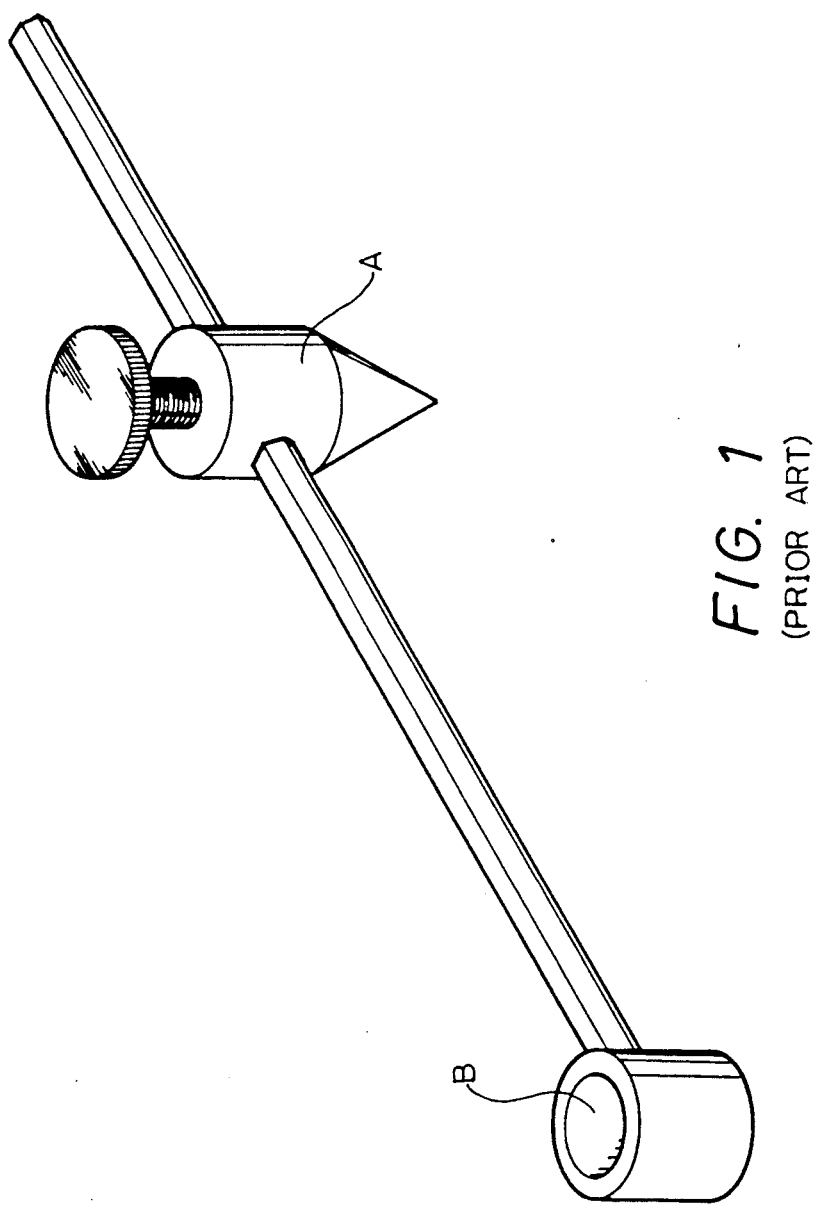
FIG. 1 is a perspective view of a traditional tool for cutting a circular plate with a gas burner.
Figure 2:
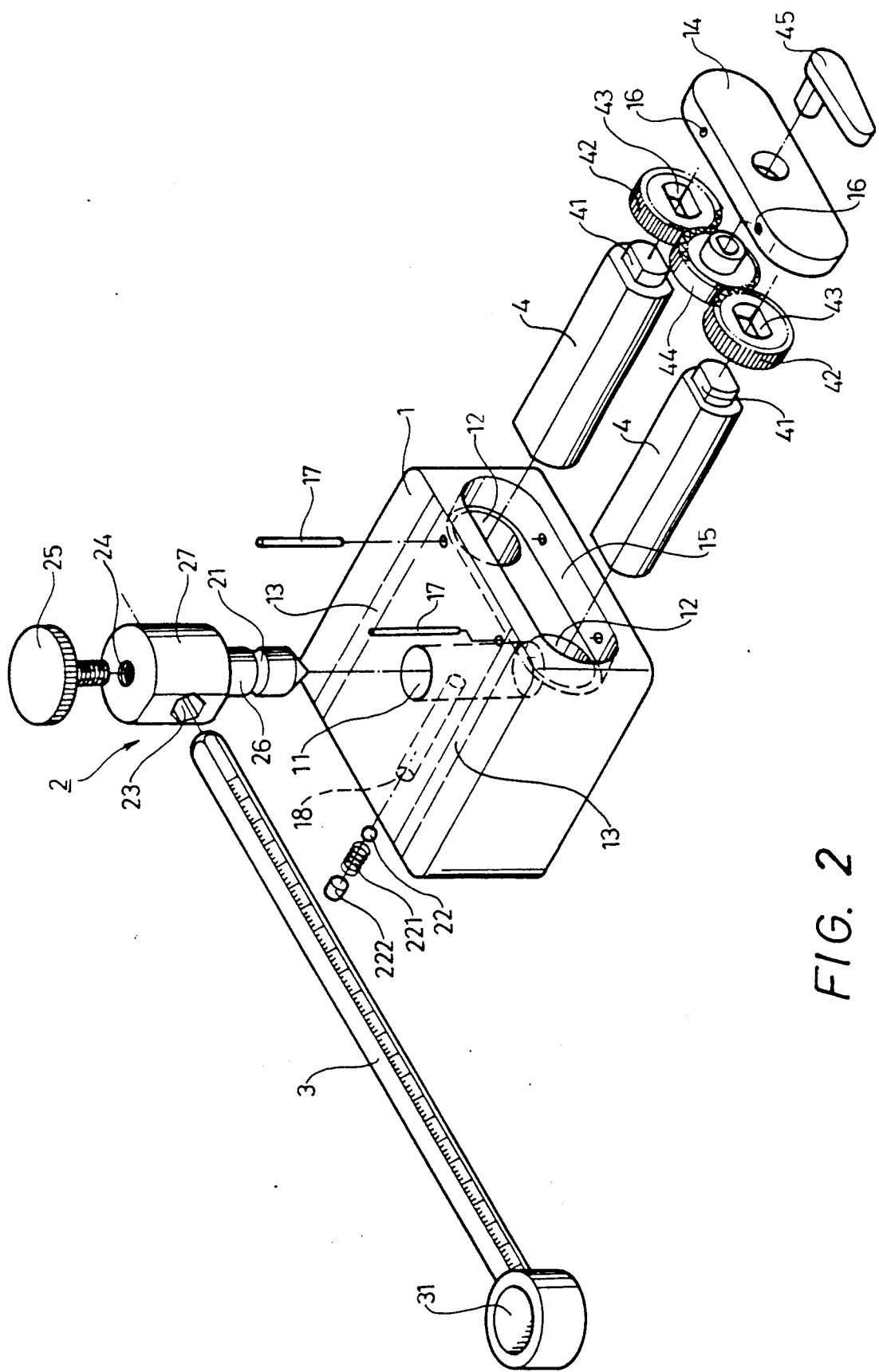
FIG. 2 is an exploded perspective view of the base for cutting a circular plate with a gas burner in the present invention.
Figure 3:
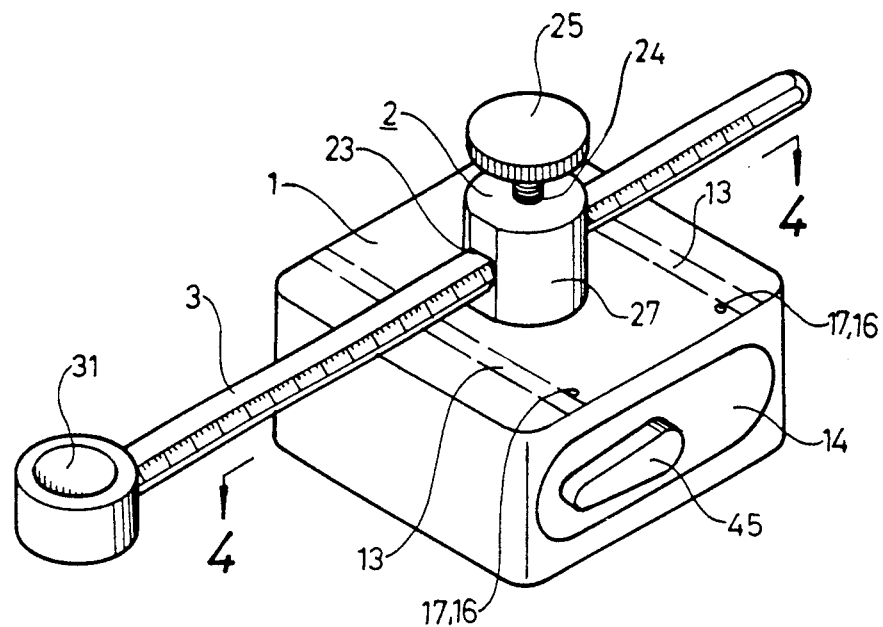
FIG. 3 is a perspective view of the base for cutting a circular plate with a gas burner combined all together in the present invention.

The base for cutting a circular plate with a gas burner in the present invention comprises a base body 1, a rotatable shaft 2, an arm 3, two magnetic blocks 4 as the main components.

The case body 1 is made of an electrically conductive material, having two parallel horizontal holes properly spaced apart for two magnetic blocks 4 to fit therein and an oval opening 15 for an oval cap 14 to fit therein covering the outer end of the magnetic blocks 4. The oval plate 14 is held at its place by means of pins 17 inserting in pin holes 16 to prevent the magnetic blocks 4 from falling off. The base body 1 also has a vertical round through hole 11 for the rotatable shaft 2 to insert and rotate therein.

The rotatable shaft 2 has a lower section 26 and an upper section 27 of larger diameter than the lower one. The lower section 26 is to be inserted in the vertical hole 11 in the base body 1 having a ring groove 21 for a ball 22 to rest in so that the rotatable shaft 2 may rotate at the definite height by means of the ball 22 fitting in the groove 21. The shaft 2 also has a sidewise hexagonal through hole 23 at the upper section 27 for the arm 3 having the same shape of its cross-section to pass through, and a vertical threaded hole 24 for a thumb screw knob 25 to screw in and press the arm 3 with its end, as the hole 24 communicates with the hexagonal hole 23.

The arm 3 has its cross-section shaped as the same as the hexagonal hole 23 to pass through it freely and is marked with metric graduations to measure the radius of a circular plate to be cut. In addition, a circular base 31 with a round hole at the center is fixed at one end of the arm 3 for a gas burner to be inserted through its hole and to be moved around in a circle with the shaft 2 as its center.

The two magnetic blocks 4 are shaped oval in the cross-section and have an oval projections 41 at the outer end to fit in inner oval holes 43 in two gears 42. The two gears 42 engage with a main gear 44 pinched between said gears 42, and the main gear 44 is connected with and can be rotated by a handle 45 extending out of the oval cap 14 in the opening 15 of the base body 1. When the handle 45 is rotated for 90°, it can rotate the main gear 44 for the same angle and accordingly the two gears 42, which in order rotate the two magnetic blocks 4 for 90° too. The main gear has two geared sections and two non-geared sections mixing between one another so that the handle is restricted in the direction and the angle of rotation.

Figure 4:
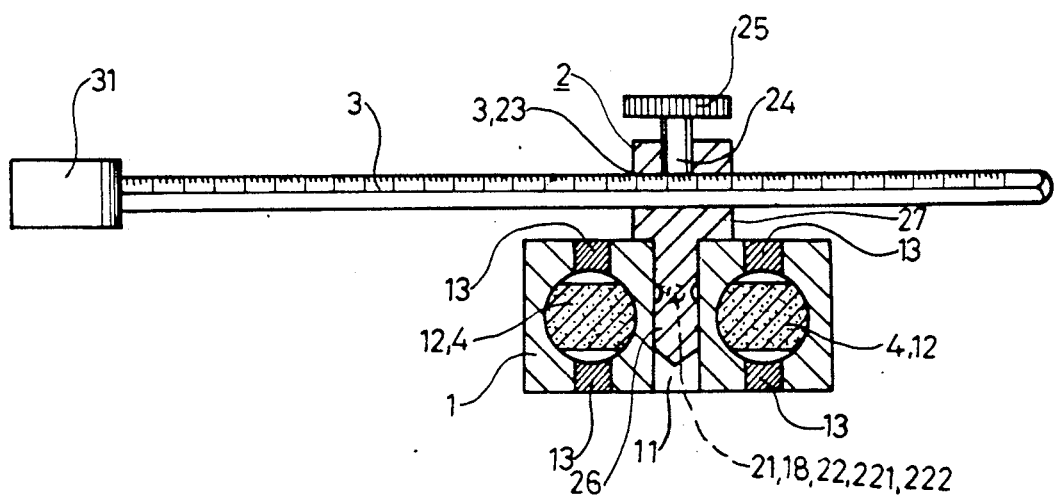
FIG. 4 is a cross-sectional view taken along line 4—4 of FIG. 3.

Next, as shown in FIGS. 1 and 4, the base body 1 has insulators 13 on and under each hole 12, so when the magnetic blocks 4 in the holes 12 are in the position wherein both flat sides are horizontal, the magnetism of the blocks 4 cannot magnetize the base body 1 to suck a metal plate to be cut.

Figure 5:
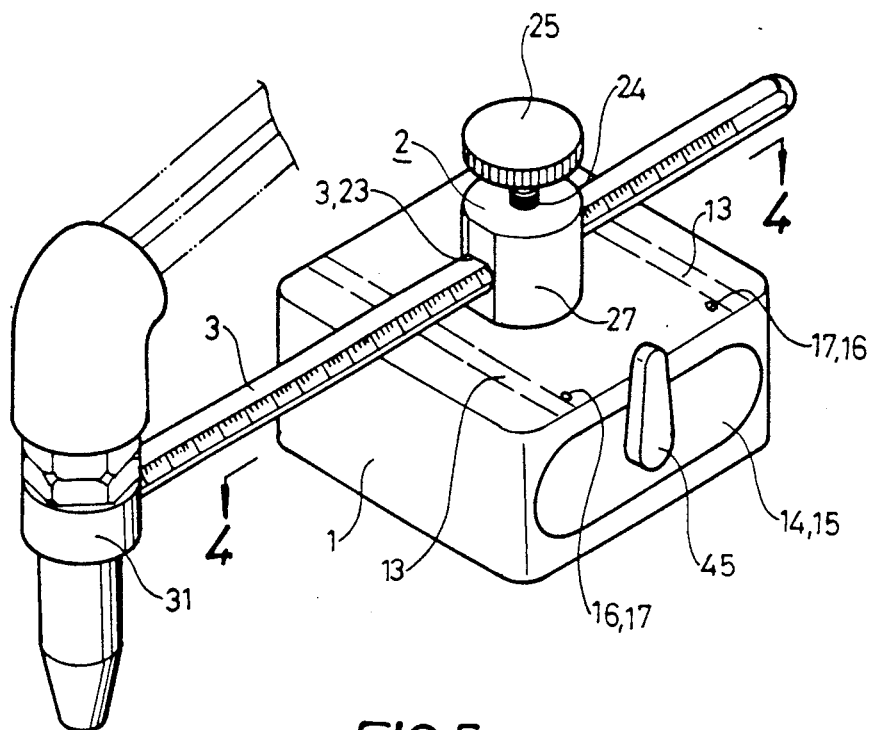
FIG. 5 is a perspective view of the base for cutting a circular plate practically used with a gas burner.
Figure 6:
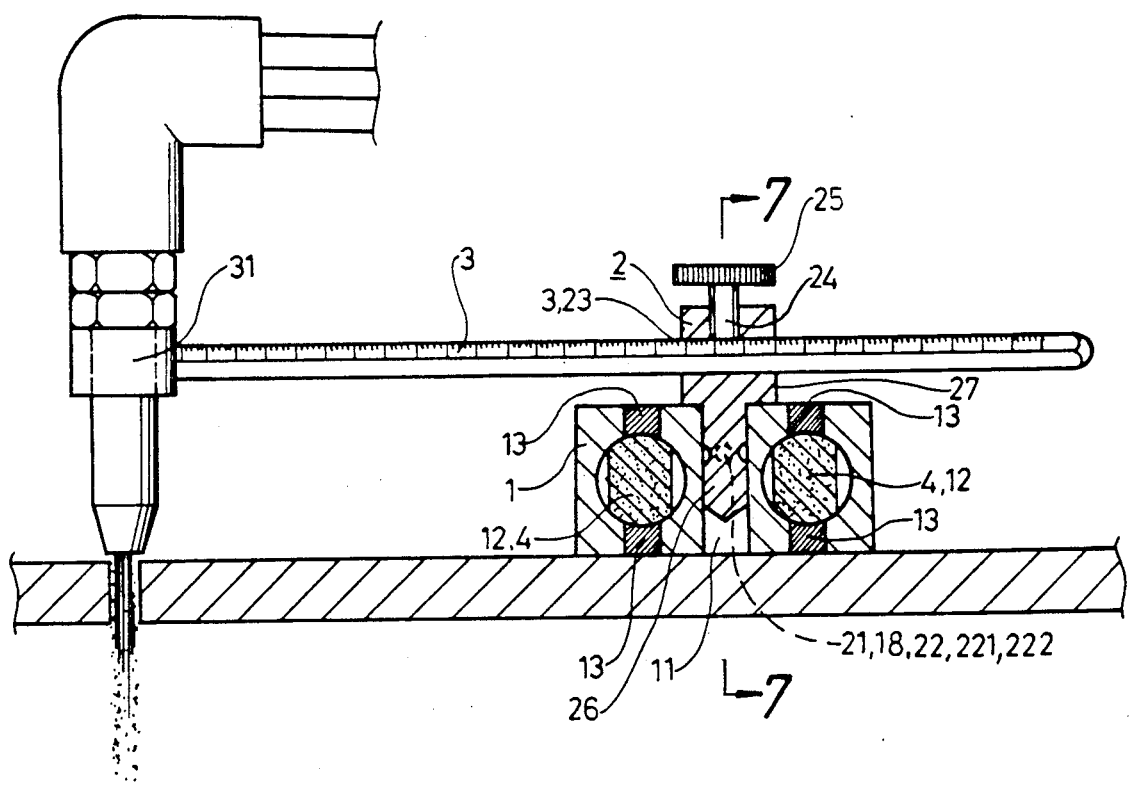
FIG. 6 is a cross-sectional view taken along line 6—6 of FIG. 5.
Figure 7:
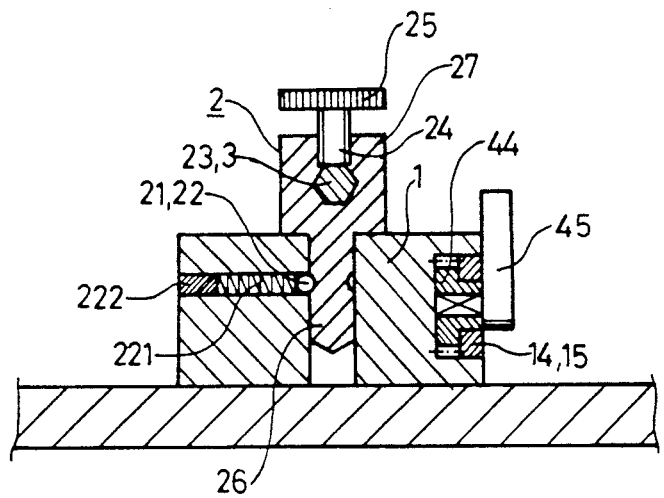
FIG. 7 is a cross-sectional view taken along line 7—7 of FIG. 6.

Next, as shown in FIGS. 5 and 6, when the magnetic blocks 4 is turned for 90° by rotation of the handle 45, the base body 1 can be magnetized by the magnetic blocks 4, as the oval sides of said blocks 4 become horizontal to touch with the insulators 13. Then, the base body 1 sucks the metal plate to sit firmly on said plate so that the gas burner can be held in the holed base 31 at the end of the arm 3 by means of the thumb screw knob 25 screwed to keep the arm 3 at an adjusted length steadily and immovable. Thus, the gas burner can be moved in a circle preset with the shaft 2 as a center rotating in the base body 1, and the center of the circle can never be moved or slide off in cutting process of the gas burner held in the holed base 31.

Figure 8:
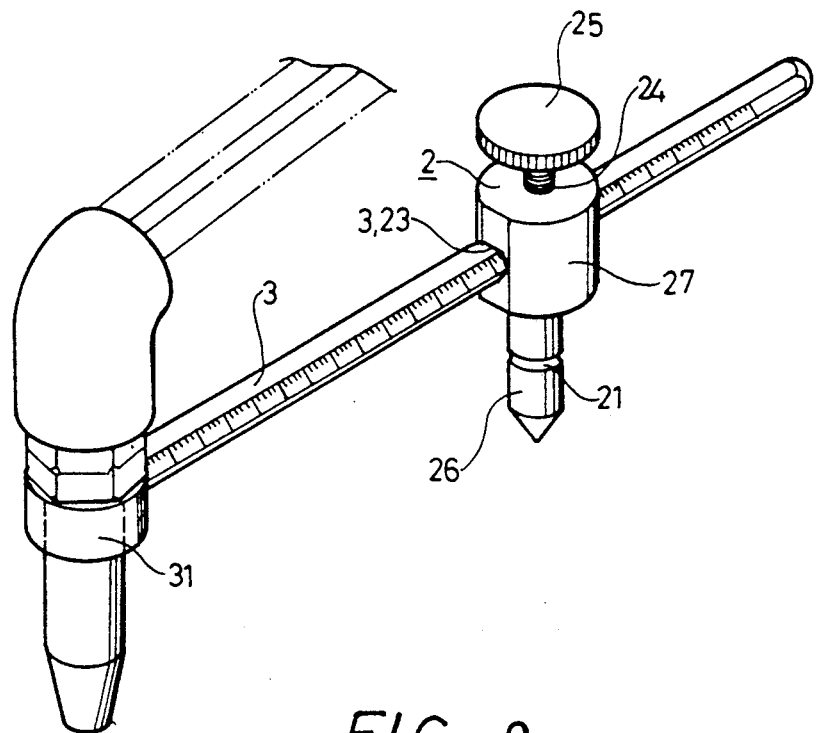
FIG. 8 is a perspective view of the base for cutting a circular plate used in another way in the present invention.

In addition, the base body 1 has a horizontal small hole 18 in the rear surface communicating with the vertical hole 11. A ball 22 and a spring 221 are inserted in the hole 18 and a hole stopper 222 seals the mouth of the hole 18 such that the ball 22 can be pushed by the spring 221 to fit in a ring groove 21 in the rotatable shaft 2 so that said shaft 2 can be rotated in the hole 11 guided by the ball 22 in the ring groove 21. However, the rotatable shaft 2 can also be used independently as a traditional tool, separated from the base body 1 as shown in FIG. 8.

What is claimed is:

1. Apparatus for cutting a circular plate with a gas burner comprising a magnetic body having a base surface for placement on the plate, a vertical hole in the body, a post rotatably and removably receivable in the hole, an enlarged head on the post, a horizontal through-bore in the head, a gas burner carrier arm receivable in the through-bore, adjustment means on the head for releasably securing the arm in selected position to the head, and releasable magnetic means in the body for releasably securing the body to the plate, said securing means comprising a pair of parallel elongate bar magnets received in horizontal bores in the body, insulating means extending between the respective bores and said base surface, a drive gear at one end of each magnet, a central gear meshing with each drive gear, the gears being received in a recess at one side of the body, a cover for the recess and an external pivot arm connected to the central gear through the cover for selectively and reversibly rotating the central gear to align respective poles of the magnets selectively with the insulation means and at right angles thereto for magnetic attraction and release of the body with respect to the plate.

2. Apparatus as claimed in claim 1 wherein the post has a circumferential groove and the body includes a spring detent receivable in the groove.

* * * * *